(12) United States Patent
Taboada et al.

(10) Patent No.: US 7,170,695 B2
(45) Date of Patent: Jan. 30, 2007

(54) HIGHLY VERSATILE OPTICAL ELEMENT MOUNT

(76) Inventors: John Taboada, 12530 Elm Country, San Antonio, TX (US) 78230; John Martin Taboada, 12718 Cranes Mill, San Antonio, TX (US) 78230

( * ) Notice: Subject to any disclaimer, the term of this patent is extended or adjusted under 35 U.S.C. 154(b) by 141 days.

(21) Appl. No.: 10/905,871

(22) Filed: Jan. 25, 2005

(65) Prior Publication Data
US 2006/0164737 A1    Jul. 27, 2006

(51) Int. Cl.
*G02B 7/02* (2006.01)

(52) U.S. Cl. .................. 359/819; 359/811; 359/822; 359/823

(58) Field of Classification Search ............... 359/811, 359/813, 819, 821, 822, 823, 818, 710; 385/34
See application file for complete search history.

(56) References Cited

U.S. PATENT DOCUMENTS 6,710,944 B2    3/2004    Berto

*Primary Examiner*—Alicia M. Harrington
*Assistant Examiner*—Brandi Thomas
(74) *Attorney, Agent, or Firm*—John Martin Taboada

(57) ABSTRACT

A highly versatile optical mount fabricated from a single solid structural body provides accurately centered secured fixturing of a large array of optical components or objects. Fixturing is provided by a unique screw-tensioned strapping mechanism.

8 Claims, 4 Drawing Sheets

HIGHLY VERSATILE OPTICAL ELEMENT MOUNT

DESCRIPTION

1. Field of the Invention

This invention is directed to devices for rapidly mounting and securing optical elements to a moveable fixture. This invention is also directed to fixturing of any type where the elements to be fixtured suit the mounting geometry.

2. Description of Prior Art

The scope of the present invention includes applications in fixturing in general but most specifically in precision mounting of optical components for optical set ups in research or education. Devices for optical mounting are well known in the field.

Two examples of well known prior art devices for achieving optical mounting are shown in FIGS. 1 and 2. In the example of FIG. 1, the optical component to be mounted is placed at the center of a ring and fixating screws are tightened until the optical component is fixed. The limitations of this device include 1) centering is confounded by the need for multiple screw adjustments, 2) the device is generally much larger than the optical component to be mounted, and 3) the process of tightening is unstable, 4) long optical elements have a tendency to tilt about the center of the ring, and 5) it has difficulty clamping non-cylindrical components and 6) optical component size range is limited to ring dimensions.

An improvement in prior art over that of the aforementioned is the bar clamping device shown in prior art FIG. 2. This device is a V-block equipped with a sliding bar sliding on attached guide pins. A press bar pushed by a screw passing through the sliding bar clamps the optical component against the V-block. This prior art device, although having improved centering, still has the following limitations: 1) the device structure is much larger than the optical component to be mounted, 2) the contact point between the screw and the press bar requires a complex rigid pivot axis to prevent clamping instability, 3) the guide pin and sliding bar combination requires precision close tolerance parallel construction to prevent binding of the slide bar, 4) the sliding bar has a tendency to slip with increased tightening torque applied to the screw, and 5) optical component size is limited to the dimension of the space between the guide pins.

SUMMARY OF THE INVENTION

In accordance with the present invention, a single solid structural rectangular body is cut to provide a threaded screw hole at one end, a slot at the other and a V-block cut or optical flat between these cuts. In addition, it is combined with a hollow screw and a trapping spring-loaded off-center pivoting wheel. Objects, in general, and optical components in particular are clamped by passing a strap with a beaded end such as a tie strip through the hollow screw, around the object and into the trapping mechanism. The strap is tied down by unscrewing the hollow screw against the beaded end. Lenses, prisms, blocks, tubes, lasers, tools, work pieces, and the like may be secured by the present invention.

OBJECTS AND ADVANTAGES

Accordingly, several objects and advantages of the present invention are:

a) To provide an improved optics holder of very compact dimension, high versatility, and very high clamping strength.

b) To provide an improved optics holder that overcomes the limitations of the recited prior art.

c) To provide an improved design for an optics holder that is easy to manufacture and use.

d) To provide an improved design for an optics holder that can be adapted to a large range of object dimensions and fixturing requirements.

DETAILED DESCRIPTION OF THE PREFERRED EMBODIMENTS

Figure 1:
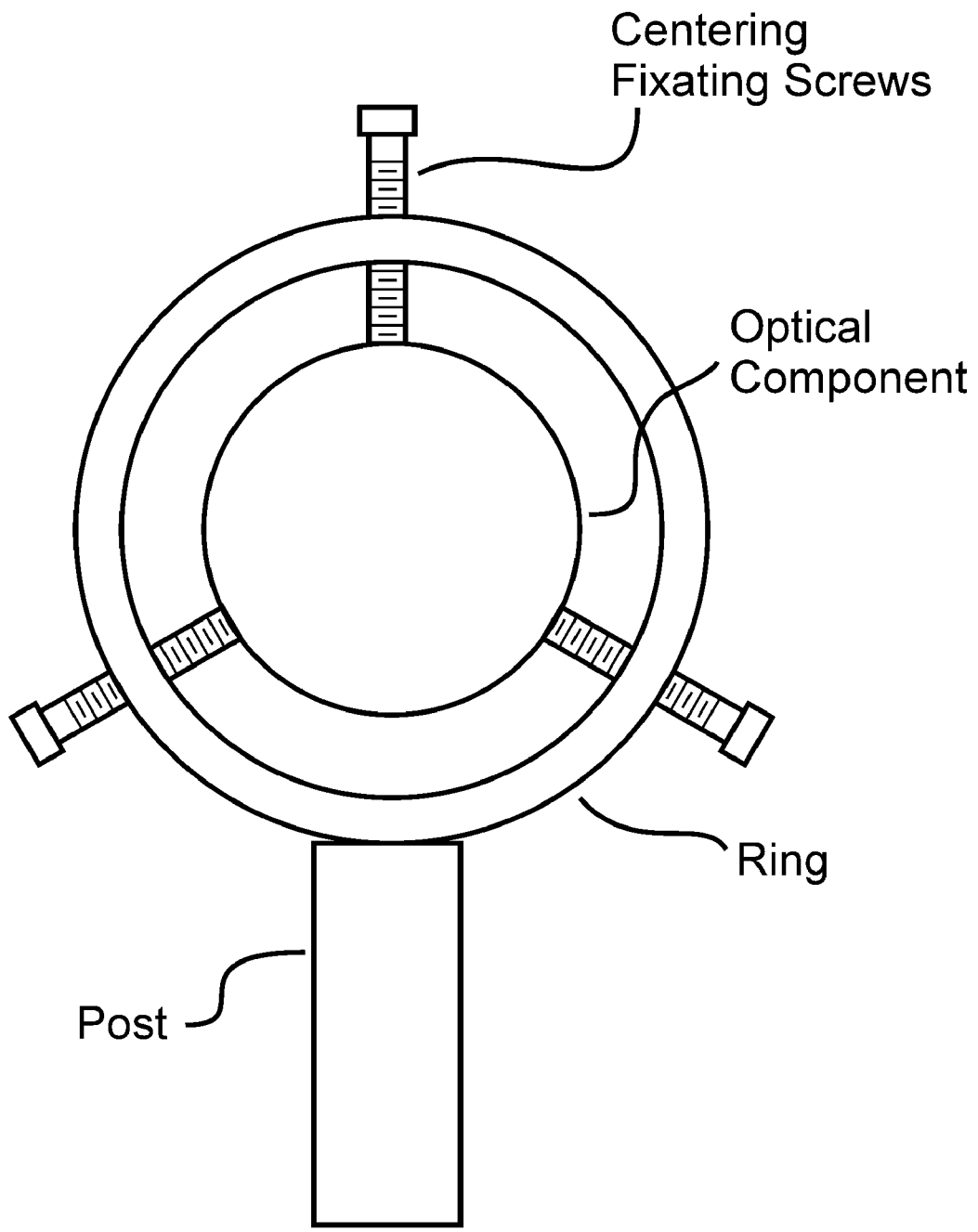
FIG. 1 is a first example of well-known prior art.
Figure 2:
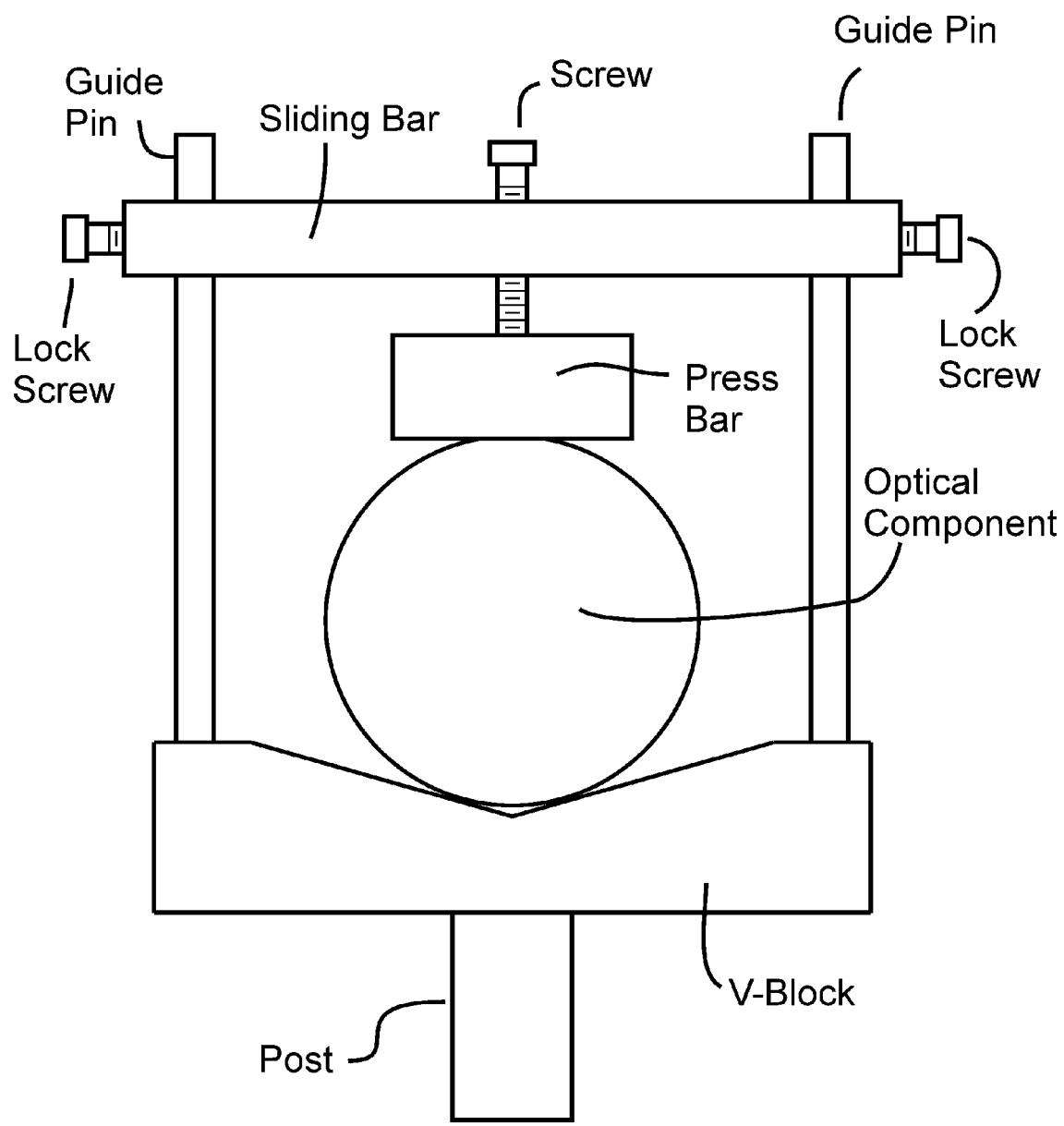
FIG. 2 is a second example of well-known prior art.
Figure 3:
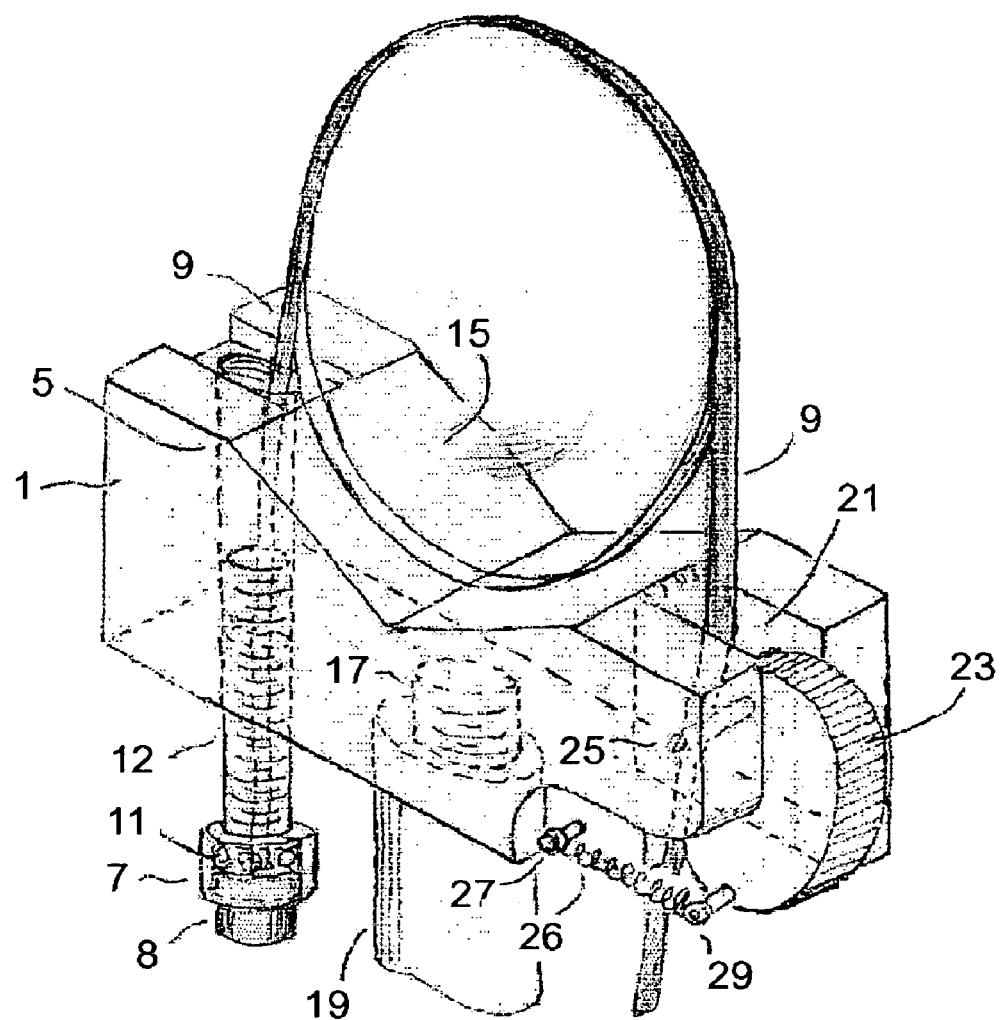
FIG. 3 is an isometric view of the preferred embodiment of the present invention where some hidden lines are excluded for clarity.
Figure 4:
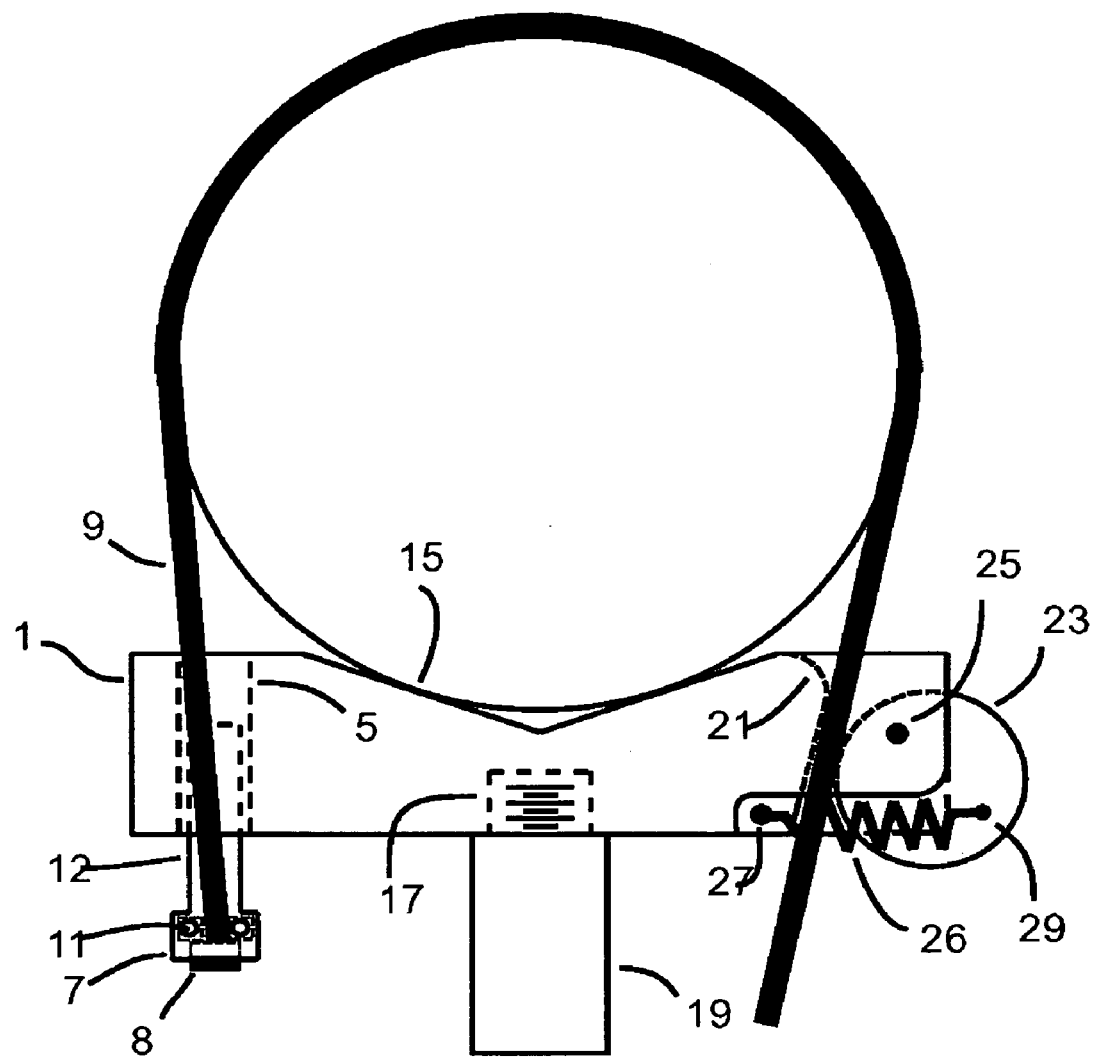
FIG. 4 is a plan view of the preferred embodiment of the present invention shown in FIG. 3, where like features are numbered with like numbers.

The preferred embodiment of the present invention is illustrated in FIGS. 3 and 4, where like features are labeled with like numbers.

The highly versatile optical mount is fabricated from a single solid structural body 1. The structural body has a threaded hole 5 on one end and a slot 21 on the other end. The structural body also has a V-block recess 15 between the hole and the slot. An optional flat may be located between the hole and the slot. A hollow screw 7 with threaded portions 12 is threaded into the threaded hole. Within the slot is placed a wheel 23 with serrated rim and affixed with an off-axis pivot pin 25 allowing the wheel to rotate about the pivot pin. An extension spring 26 connects the rim of the wheel to the structural body at tie points 29 and 27 on the wheel and structural body respectively. The spring forces a rim portion of the wheel against a portion of the slot on the structural body. A bearing 11 is pressed into the hollowed-out portion of the hollow screw and is captured there. A threaded hole 17 is provided to permit attaching the mount to a fixed structure such as a pin 19. To use the mount, a flexible strap 9 with a enlarged head end 8 such as a conventional tie strip is passed through the bearing and the hollow bolt with the head 8 capturing the strap at the proximal terminus against the bearing 11. The strap's distal terminus is passed around the object to be mounted and passed between the structural body and the wheel and is pulled tight. The wheel locks the strap. The hollow bolt is retracted by an unscrewing motion to greatly increase the binding action of the strap. To release the component, the screw is threaded back in and the strap is further released by pushing the serrated wheel.

Although the above description contains many specificities, these should not be considered as limiting the scope of the invention but as merely providing illustration of the presently preferred embodiment of this invention.

The scope of usage includes but is not limited to: optical component mounting, tool holding, work piece holding, or material handling.

Accordingly, the scope of the invention should be determined not by the embodiment illustrated, but by the appended claims.

What is claimed is:

1. A method for creating a highly versatile optical element mount comprised of the steps of:

providing a threaded hole at the first far end of a solid elongated body component;

providing a slot at the second far end of the said body component;

providing a V-block cut or flat between said slot and said hole;

providing a hollow screw threaded into said threaded hole of said body component;

providing an enlarged hollow portion within the head end of said hollow screw;

providing an eccentrically pivoted serrated wheel placed within the slot of the said body component;

spring loading said wheel against said body component;

passing the distal terminus of a flexible band possessing an enlarged portion at its proximal terminus through the bearing and the hollow screw, further looping the distal end over or outside an optical component to be mounted, and passing said distal end between said body component and the thumb wheel;

pulling said flexible band at the distal end such that the proximal terminus is captured at the limiting diameter of said bearing;

allowing the spring loaded thumb wheel to lock said flexible band; and increasing the clamping force of the flexible band by unscrewing said hollow screw, drawing the flexible band by exerting pulling force on the enlarged portion at the proximal end of said band.

2. The flexible band of claim 1, wherein said flexible band is a conventional cable tie strip and wherein said enlarged portion at the proximal end is the ratchet end of the tie strip.

3. The flexible band of claim 1, wherein a bearing is provided in said enlarged hollow portion within said hollow screw.

4. The method for creating a highly versatile optical element mount of claim 1 wherein multiples of said mount may be used in combination to achieve fixturing of extended or heavy objects.

5. A highly versatile optical element mount comprising:

a solid elongated body component;

a threaded hole located at a first far end of said body component;

a slot located at the second far end of said body component;

a V-block cut or flat located between said threaded hole and said slot a hollow screw threaded into said threaded hole of said body component;

an enlarged hollow portion within the head end of said hollow screw;

an eccentrically pivoted serrated wheel placed within the slot of said body component;

a pivot pin passing through a portion of said body component and said wheel;

a loading spring connecting a rim point on said wheel to a point on the body component;

a flexible band possessing an enlarged portion at the proximal end; and a second threaded hole in said body component for securing said optical element mount to any external structure.

6. The flexible band of claim 5, wherein said flexible band is a conventional cable tie strip and wherein said enlarged portion at the proximal end is the ratchet end of the tie strip.

7. The flexible band of claim 5, wherein a bearing is pressed into said enlarged hollow portion within said hollow screw.

8. The highly versatile optical element mount of claim 5 wherein multiples of said mount may be used in combination to achieve fixturing of extended or heavy objects.

* * * * *